United States Patent [19]

Hansen et al.

[11] Patent Number: 5,500,511
[45] Date of Patent: Mar. 19, 1996

[54] TAILORED SUSCEPTORS FOR INDUCTION WELDING OF THERMOPLASTIC

[75] Inventors: Karl A. Hansen, Seattle; C. David Lunden, Federal Way, both of Wash.

[73] Assignee: The Boeing Company, Seattle, Wash.

[21] Appl. No.: 286,360

[22] Filed: Aug. 5, 1994

Related U.S. Application Data

[63] Continuation-in-part of Ser. No. 68,520, May 27, 1993, abandoned, which is a continuation-in-part of Ser. No. 777,889, Oct. 18, 1991, abandoned.

[51] Int. Cl.⁶ .................................................. H05B 6/10
[52] U.S. Cl. ........................... 219/633; 219/634; 219/759; 156/272.4; 156/380.2
[58] Field of Search ................................. 219/633, 634, 219/618, 647, 649, 759, 656, 670; 156/272.4, 272.2, 379.8, 380.2, 380.5

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,379,829 | 3/1956 | Pedlow et al. . |
| 2,423,922 | 7/1947 | Arndt, Jr. . |
| 2,589,777 | 3/1952 | Collins . |
| 2,761,941 | 9/1956 | Ardichvili . |
| 2,898,435 | 8/1959 | Crafts . |
| 3,061,503 | 10/1962 | Gould et al. .................. 156/272.4 |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,427,421 | 2/1969 | Matheson et al. ................. 219/634 |
| 3,431,379 | 4/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |
| 4,521,659 | 6/1985 | Buckley et al. . |

(List continued on next page.)

FOREIGN PATENT DOCUMENTS

| | | |
|---|---|---|
| 0461979B1 | 4/1994 | European Pat. Off. . |
| 54-25542 | 2/1979 | Japan . |

OTHER PUBLICATIONS

J. Giachino, Welding Skills and Practices, Am. Tech. Soc., Chicago, IL (1960,1965,1967,1971,1976) 393–401.

*Primary Examiner*—Philip H. Leung
*Attorney, Agent, or Firm*—John C. Hammar

[57] ABSTRACT

To obtain more uniform heating across the susceptor when welding composite parts using induction heating, we create edge regions of lower absolute impedance or a lower longitudinal impedance than the transverse impedance to counterbalance the higher current density and current that occurs near the edges. We achieve lower impedance at the edges by altering the aspect ratio (length/width) of openings in the susceptor, by folding the susceptor over onto itself, or both. Uniform heating is important to obtaining a uniform, consistent weld on which aerospace designers can rely.

22 Claims, 5 Drawing Sheets

U.S. PATENT DOCUMENTS

| | | |
|---|---|---|
| 4,653,396 | 3/1987 | Wennerberg . |
| 4,673,450 | 6/1987 | Burke . |
| 4,768,433 | 9/1988 | Boissevain . |
| 4,791,260 | 12/1988 | Waldman . |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden ................................ 219/634 |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |

200 WATTS
5 SECONDS
RATIO 1:1

200 WATTS
5 SECONDS
RATIO 2.4:1

200 WATTS
5 SECONDS
RATIO 2.8:1

FIG. 5A
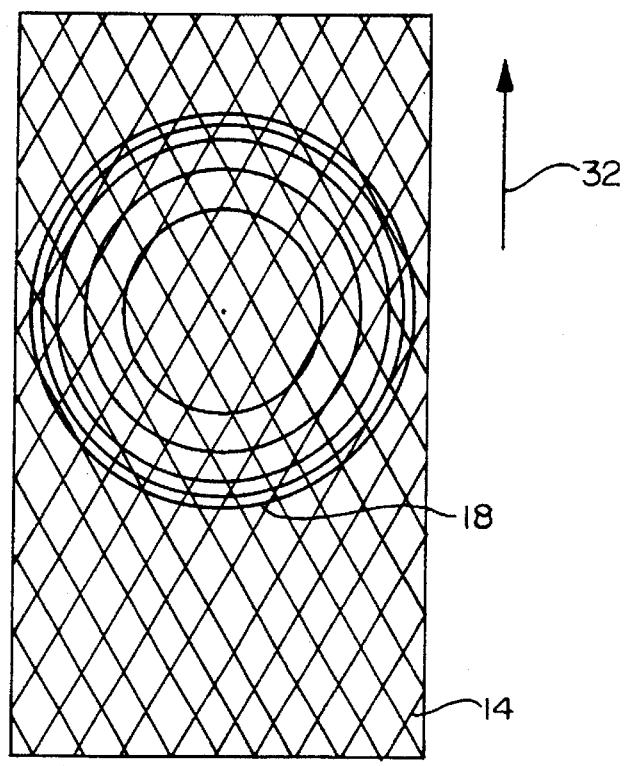
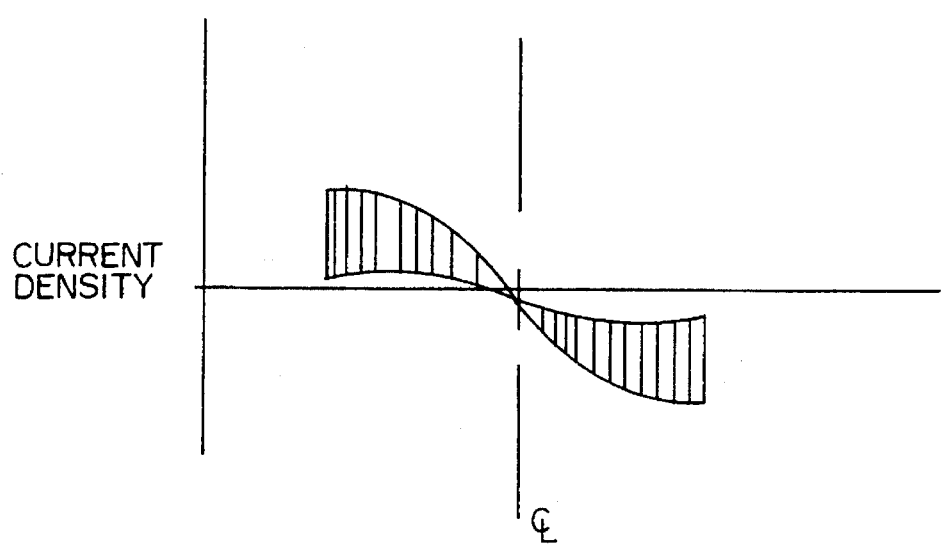
FIG. 5B 40  14

50  14

300 WATTS
5 SECONDS
NO SELVAGE

300 WATTS
5 SECONDS
1/8 IN. SELVAGE
ON LEFT

30 WATTS
5 SECONDS
1/4 IN. SELVAGE
ON LEFT

TAILORED SUSCEPTORS FOR INDUCTION WELDING OF THERMOPLASTIC

REFERENCE TO RELATED APPLICATIONS

This application is a continuation-in-part application based upon U.S. patent application Ser. No. 08/068,520, filed May 27, 1993, which was a continuation-in-part application based upon U.S. patent application Ser. No. 07/777,889, filed Oct. 18, 1991, both now abandoned. These applications are incorporated by reference.

TECHNICAL FIELD

The present invention relates to induction welding of multiple plies of thermoplastic materials to form a thermoplastic fusion bond using a thin, perforated, metal susceptor embedded in an adhesive placed between the plies of the assembly. An induction coil induces eddy currents in the susceptor to heat the susceptor, adhesive, and resin in the prefabricated composite parts to create the weld. The heating is usually sufficient to melt the resin of the prefabricated resin composite parts that are bonded together so that the adhesive (also called, a resin) and matrix resin mix to form the weld bond.

BACKGROUND ART

Three major joining technologies exist for aerospace composite structure: mechanical fastening; adhesive bonding; and welding (also called, fusion). Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding requires complicated surface pretreatments.

In contrast, thermoplastic welding features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the susceptor functions as a hot melt adhesive. If fully realized, the thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures Because magnetic field strength decreases exponentially as the fields propagate, the plies of a graphite or carbon fiber reinforced resin matrix composite structure closest to an induction coil will always be substantially hotter than the remote plies at the center of the structure, when relying upon heating through induced currents in the fibers. The fibers however, are relatively poor conductors so fields of high strength are required to achieve any significant heating. If such fields are used, then the fibers closest the induction coil (i.e., magnetic field source) heat most, and actually must overheat to obtain adequate heating at the bond line. To avoid overheating of the outer plies and to insure adequate heating of the inner plies, we use a susceptor having significantly higher conductivity than the fibers. The susceptor has a mesh pattern to allow the adhesive to bond between the prefabricated elements of the composite assembly through the susceptor. The susceptor selectively peaks the heating at the bond line.

Eddy currents that the magnetic field induces in the susceptor, however, produce a higher current density at the edges of the susceptor than in the center, which itself can produce damaging overheating at the edges of the assembly or, at the opposite extreme, underheating the center when the power is controlled to avoid edge overheating.

In our thermoplastic welding process, we apply an electromagnetic induction coil to one side of the assembly to heat the susceptor through the induced eddy currents and to melt the thermoplastic material so than when it resolidifies the elements bond together. To achieve uniform heating, the susceptor design must be tailored to control the current density the induction coil induces. The heating we achieve is directly proportional to the power which the susceptor dissipates. That power is given by the common electromagnetic equation for power loss in a resistor:

$$P = (J^2)(R)$$

wherein P is the power density, J is the eddy current density, and R is the resistance or impedance through which current flows. Therefore, to counter higher current density at the edges (i.e., a higher "J"), we tailor the susceptor near the edges to lower the resistance there relative to the center so that the product (i.e. the power and the heat) remains relatively constant across the width of the susceptor.

Prior art thermoplastic welding processes are illustrated in U.S. Pat. Nos. 3,996,402 and 4,120,712. In these processes, the susceptors have a regular pattern of openings so the resistance near the edges is identical to the resistance in the center. Therefore, these conventional susceptors produce nonuniform heating from center to edge as the current density increases toward the edge.

SUMMARY OF THE INVENTION

A tailored susceptor of the present invention controls the current density from center to edge with complimentary control of the impedance to provide even heating of the composite assembly, thereby producing a thermoplastic weld of adequate strength and integrity for aerospace applications.

By changing the aspect ratio (L/D) of openings in the susceptor, we achieve a large difference in the longitudinal and transverse conductivities in the susceptor. For example, a susceptor having openings with a length (L) to width (D) ratio of 2:1 has longitudinal conductivity (i.e., the inverse of resistance or impedance) four times higher than the transverse conductivity. This conductivity difference influences the eddy currents to run longitudinally or to turn from transverse to longitudinal because of the reduced resistance. When we use an anisotropic, diamond shaped opening such as that formed by expanding a sheet of slit foil, a ratio of the length (L) to the width (D) greater than 1 provides a superior weld than using the traditional expanded material having a L/D ratio of one (i.e., the ratio for circular openings). Our susceptor has a constant line width between openings of about 7 mils (0.18 mm) in a copper foil approximately 3–10 mils (0.075–0.25 mm) thick.

In addition to tailoring the shape of the openings, we can also alter the current density in the susceptor by increasing the foil density along the edge of the susceptor to increase the conductivity of the foil along the edge. That is we fold the foil or compress it transversely near the edge to provide a higher density of metal or simply more metal near the edge than in the center. Folding provides double thickness. Compressing provides more metal per unit width. (It also increases the aspect ratio of the openings in the susceptor by reducing the width of these openings.)

The tailored susceptor is used along a bond line between two prefabricated resin matrix composite parts in a process where an induction coil moves over the seam at a specific rate to provide uniform heating in the bondline which produces a properly cured thermoplastic weld for the composite assembly.

To simplify assembly of the preform prior to welding, we embed the susceptor within the resin. In this way, only three pieces need to be preassembled and arranged. Furthermore, by embedding the susceptor in the adhesive, the openings of the susceptor are already filled and less air is trapped in the preform. The intimate contract of the resin and susceptor means that it will melt more quickly because it is closer to the heating element.

BRIEF DESCRIPTION OF THE DRAWINGS

FIG. 5a is a plan view of a susceptor showing the relative location of the induction coil during welding.

FIG. 5b illustrates the current density in relation to the centerline of the susceptor for a thermoplastic welding process using the induction coil of U.S. Pat. No. 5,313,037.

DETAILED DESCRIPTION

Figure 1:
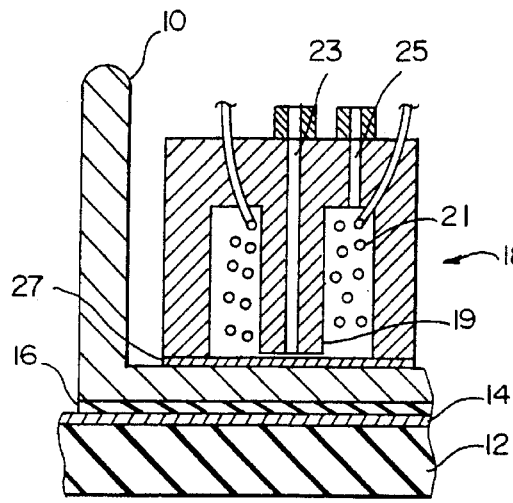
FIG. 1 is a cross-sectional view of a typical thermoplastic welding process of the present invention.

Our thermoplastic welding process is especially useful in bonding reinforced graphite parts currently used in the production of modern aircraft. The use of composite structures in aircraft has allowed the construction of lighter structures with strengths equal to or greater than traditional metal structures. The use of thermoplastic welding on composite components allows the elimination of mechanical fasteners along seams. FIG. 1 shows an L shaped member 10 of graphite fiber reinforced thermoplastic composite material above a similar panel member 12. A susceptor 14 and a layer of thermoplastic resin 16 are positioned to define a bond line. An induction coil 18 moves along the assembly at a specified rate and excites or induces eddy currents in the susceptor 14 to heat the assembly under the coil to the temperature required to melt and cure the resin. The susceptor heats up because of the flow of the eddy currents through it. Our preferred induction coil 18 is made using a powdered iron-ferrite cup-shaped core 19 wound with a Litz wire coil 21, as described in U.S. Pat. No. 5,313,037, which we incorporate by reference. The coil is excited by a power source having a frequency of approximately 50 kHz. The power required is a function of the thickness of the plies in the prefabricated composites and the nature of the materials. We circulate a cooling fluid through the core 19 by means of conduits 23 and 25 to cool the coil 18. The coolant flows into the center leg of the core 15 through conduit 23 and exits through conduit 25. A sole plate 27 the bottom of the core cavity. The core and coil design results in a magnetic field having a central null when the coil is energized. By moving the coil along the bond line at a predetermined rate, we can achieve uniform heating with our tailored susceptor necessary to reliably produce uniform, consistent welds.

The susceptor 14 generally is a copper foil having a thickness of from 0.003 to 0.010 inches (0.075–0.25 mm). We usually embed the susceptor 14 in a thermoplastic adhesive 16. The susceptor/adhesive tape is usually about 0.010 in (0.25 mm) thick. If separate metal susceptors and resin sheets are used, the resin film without the embedded susceptor is also about 0.010 in (0.25 mm) thick. Any material having good electrical conductivity may be used, but we prefer copper, nickel, or nickel-coated copper. The foil is slit by laser cutters and pulled at its edges to create expanded diamond shaped openings segmented by lines of approximately uniform thickness of 7 mils (0.18 mm). This process requires a thicker foil, however, usually about 0.020 in (0.50 mm) thick. The foil openings can be made using other conventional methods such as chemical etching or mechanical stamping. While we prefer to use diamond shaped openings because they are easy to form with expansion or etching, the openings can be any shape with the caveat that controlling the amount of metal in the lines between openings and, consequently, the performance of the susceptor, is troublesome when the lines are of varied width.

The induction coil induces currents in a nonlinear distribution across the width of the susceptor. As shown in FIG. 5a, the coil 18 generally is aligned directly over the susceptor in the welding process moving longitudinally in the direction indicted by arrow 32. Current in the coil induces eddy currents in the susceptor in direct proportion to the oscillating magnetic field strength. The coil design creates a null at the center because no current flows there in the coil and the current (and associated field) increases toward the edge of the coil. (We are only concerned with the absolute value.) Therefore, the induced currents in the susceptor are nonlinear and the resulting heating would be nonuniform unless the susceptor were tailored to adjust its impedance counter to the change in the current and current density that the coil induces.

Again, the power (P) is a function of the current (J) and the resistance (i.e. impedance) (R): $P=(J^2)(R)$. So, if the eddy current doubles, to maintain P constant, the impedance must decrease to one-fourth its initial value. FIG. 5b schematically illustrates the current density (wherein positive or negative reflects, in effect, the direction of the current flow). To maintain the power constant, then, the impedance must be much lower at the edges than it is in the center of the susceptor.

We modify the edges of the susceptor to adjust the current density so that the current density can be higher and thereby produce a proportionately higher eddy current without producing a higher temperature. While the current is higher the impedance is lower on the edges (there is more metal to carry the current), and the net effect (i.e., $(J^2)(R)$) will be substantially uniform heating.

Now, the edge treatment would produce lower temperatures at the edges than in the center if the magnetic field strength were constant across the susceptor. With our coil, however, the field strength is, highest at the edges. Therefore, the two elements (coil and susceptor) work together to yield a relatively uniform temperature in the bond line.

We have discovered several ways to control the impedance to achieve more uniform heating than conventional susceptors provide. First, we adjust the aspect ratio of diamond-shape openings in the susceptor (i.e. the ratio of the length to the width of the openings; L/D) to create a longitudinal impedance lower than the transverse impedance. Second, we fold the susceptor near the edges to produce thin strips of double thickness where the additional mass and surface area of the susceptor in these edge strips reduces the current density, which is a complimentary measure of the impedance. Third, we compress or crimp openings in regions near the edge to alter the aspect ratio and to increase the ratio of the longitudinal conductivity relative to the transverse conductivity.

In the center of the susceptor, the current that we induce with the coil has many paths in which it can flow. Near the edge, however, the choices decrease, in essence, unless we create additional current paths artificially. The coil is trying to induce a current of the largest magnitude near the edges. Therefore, we introduce, in one embodiment of the present invention, a susceptor with nonlinear impedance to counterbalance the current and to achieve relatively uniform heating.

The ratio of the length (L) to the width (D) of the openings is critical to achieving uniform heating in a foil of uniform thickness having openings of only one size and shape and uniform line widths. For the foil shown in FIG. 2 or 3, the ratio of length to width (L/D) is 2.

Figure 2:
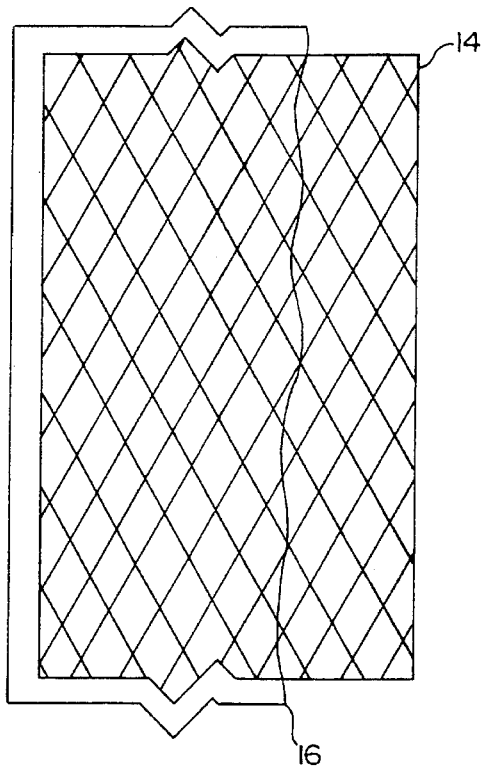
FIG. 2 is an enlarged view of a preferred susceptor of the present invention embedded in a thermoplastic resin.
Figure 3:
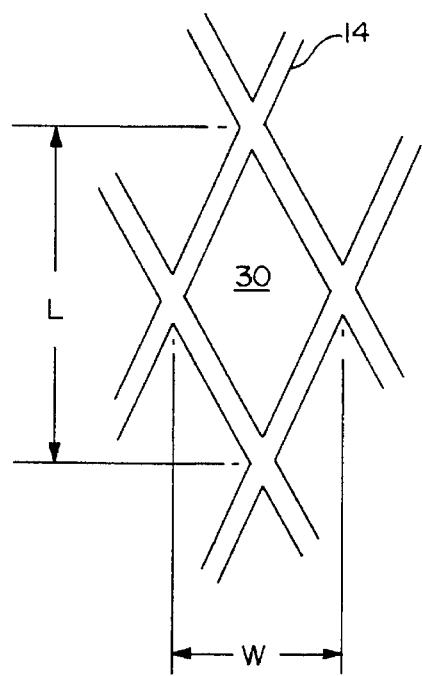
FIG. 3 is a detail of one opening 30 in the susceptor of FIG. 2.
Figure 4A:
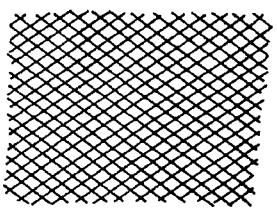
FIGS. 4a, 4b, and 4c are thermograms of three different susceptors.
Figure 4A:
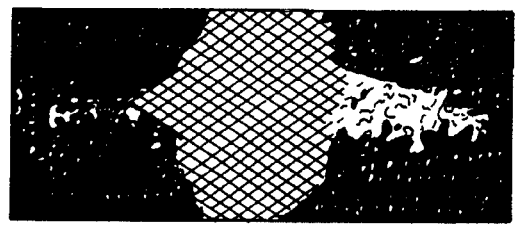
Figure 4B:
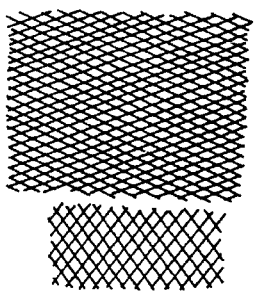
Figure 4B:
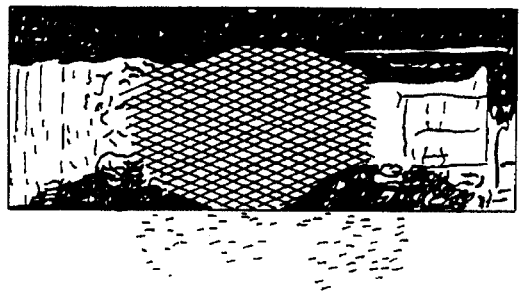
Figure 4C:
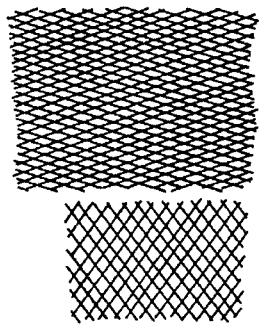
Figure 4C:
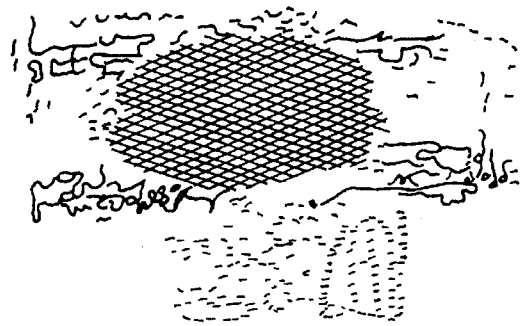

With a susceptor having a uniform distribution of openings of aspect ratio greater than one (as shown in FIGS. 2 and 3), crowding of the current along the edge of the susceptor is reduced and the temperature is more uniform even though the absolute impedance at the edges and in the center is equal. FIGS. 4a, 4b, and 4c demonstrate this effect. The higher aspect ratio provides an impedance for the susceptor which dominates the power equation so the effect of eddy current changes is masked. In each of these thermograms, we applied 200 Watts of power for 5 seconds with the induction coil. The darker areas of the thermograms indicate higher temperatures. In FIG. 4a, the openings in the susceptor foil had a L/D ratio of 1:1. With this susceptor, the temperature was substantially higher at the edges than in the center. In FIG. 4b, the ratio of L/D in the susceptor was 2.4:1. Here the nonuniform heating along the edge of the susceptor was less than that shown for the susceptor in FIG. 4a. In FIG. 4c, the L/D ratio was 2.8:1, and the heating was the most uniform.

The longitudinal conductivity is higher than the transverse conductivity principally because the path length for the current to flow longitudinally is more direct and consequently shorter than that required for transverse flow.

Figure 6:
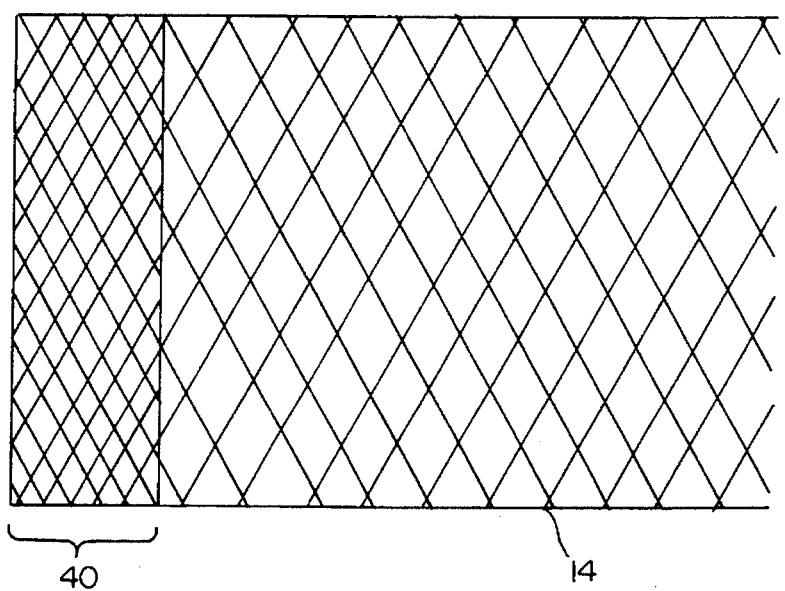
FIG. 6 is a view of the susceptor folded at the edge to increase foil density.
Figure 7:
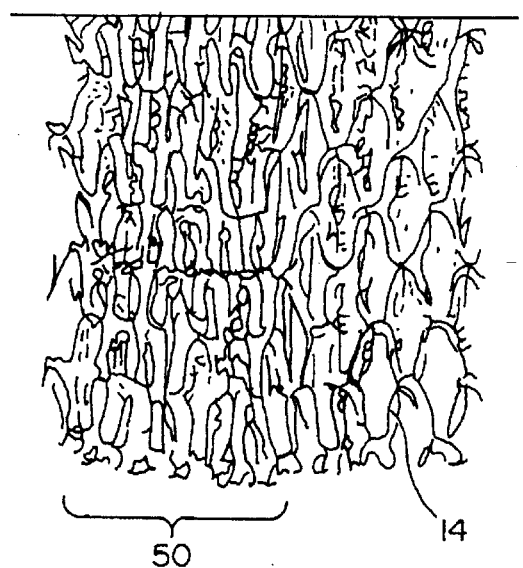
FIG. 7 is a view of the foil susceptor with a compressed edge to increase foil density.
Figure 8A:
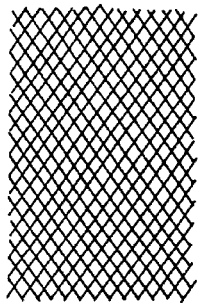
FIGS. 8a, 8b and 8c is a series of thermograms showing the effect of edge tailoring of the susceptor.
Figure 8A:
Figure 8B:
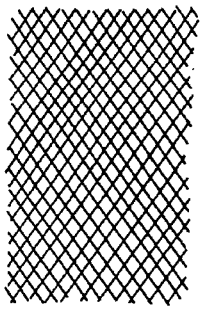
Figure 8B:
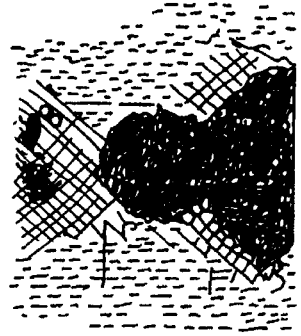
Figure 8C:
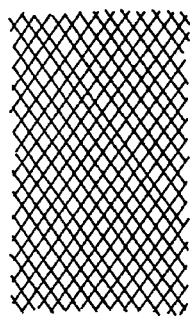
Figure 8C:
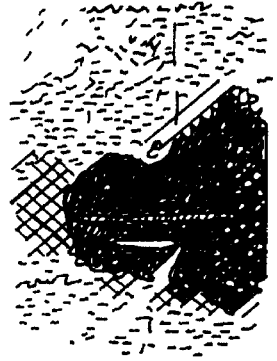

In FIG. 6, the susceptor 14 is folded over on itself near the left edge to form a double thick region 40 at the edge. Of course, double thickness could simply be manufactured into the susceptor. In FIG. 7, the susceptor 14 has been compressed slightly inwardly along its edges to from a region 50 where the aspect ratio (L/D) is higher than in the center portion and the density of metal (gm/cm$^3$) is increased over the center portion. Both factors reduce the current densities in region 50 so heating at the edges is reduced. Again, the combined effect with the higher field strength results in a more uniform temperature in the bond line. The thermographs of FIGS. 8a, 8b, and 8c illustrate the effect of tailoring the edge of the susceptor. In each test, we applied 300 Watts of power for 5 seconds. In all cases the susceptor had a square diamond shape pattern with an aspect ratio of 1:1. In FIG. 8a, the susceptor had no change at its edge, and higher heating at the edge of the susceptor is obvious. In the susceptor of FIG. 8b, we formed a folded edge about ⅛ inch (3 mm) wide by folding the susceptor over on itself. The edge overheating on this sample (i.e., the absence of black in the thermograph) was substantially reduced. In FIG. 8c we folded the left edge ¼ inch (6 mm) of the susceptor over on itself. In this example, edge heating was further reduced. We also have achieved a reduction in edge heating by compressing a portion of the susceptor edge to form a susceptor like that illustrated in FIG. 7.

The edge techniques can be combined to achieve the desired tailoring. Instead of compressing the susceptor to form the edge region 50, we can form the susceptor with a grading in the openings (i.e. higher aspect ratios toward the edge) such as square diamonds in the center and elongated diamonds in the edge region. The grading can be in distinct steps or can be gradual across the width.

Our goal is to produce aircraft structure that eliminates fasteners. Welded structure will be far less expensive because welding will eliminate the labor to drill holes accurately and to inspect the fasteners after installation. We also will avoid other problems that fasteners introduce, such as sealing around the fastener and the holes, mismatch of materials, and lighting arcing front the fasteners. To replace the fasteners, however, requires confidence that the welds are uniform and consistent, because a failure at any weak point in the weld could lead to catastrophic unzipping of the entire welded structure. The present invention, then, focuses upon one of the most important problems, temperature uniformity along the bond line to achieve uniform and complete melt and cure of the adhesive. A typical application would be welding a wingskin to the underlying spars.

As mentioned earlier, we embed the susceptor in the resin to simplify the welding process. Making a susceptor/resin tape of the type shown in FIG. 2 eliminates the steps of applying separate layers of resin between the respective elements in a composite-susceptor-composite assembly. It also ensures that there will always be adequate resin proximate the susceptor and essentially uniform resin thickness across the welding bond line. Our typical tape is about 2 inches wide with KIII Avimid polyimide resin (available from du Pont), although we can use PEEK, PEKK, PES, or any other thermoplastic. The resin must be compatible with the matrix resin in the composite and generally the resin the same resin as the matrix resin. While the prefabricated composites usually are thermoplastics, we are also experimenting with thermoset resins. We generally add sacrificial plies in the area of the bond line and profile match the prefabricated parts by machining these sacrificial plies.

The composites we join with thermoplastic welding are typically the same materials and are prefabricated before the welding. Typically, the composite is a carbon or graphite fiber reinforced KIII Avmid polyimide that has a melt temperature of 310° C. (620° F.). It is resin rich in the region of the bond line. We complimentary profile the surfaces of the composite parts to ensure a weld free from voids. We assemble the composite parts with the resin/susceptor tape lying along the bond line, and complete the welding by moving the induction coil from one end to the other at about 2–4 inches (5–10 cm) per minute. We can use multiple passes to improve the weld, according to the method of Walker and Peterson as described in the copending application Ser. No. 08/367,546 filed Jan. 3, 1995.

This invention permits control of the heating of thermoplastic welding process by tailoring the susceptor shape and edge density according to the needs of the particular assembly we weld.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. A susceptor for use in thermoplastic welding of composite parts, comprising a sheet of electrically conductive material having a thickness of about 0.075–0.25 mm and having a uniform distribution of substantially uniform size, diamond-shaped openings extending through the material, said openings having a length and a width defined by straight lines of the material of approximately uniform thickness of about 0.18 mm, the aspect ratio of the length to the width being greater than 1.0 to provide a longitudinal impedance along the susceptor less than the transverse impedance so that the susceptor heats more uniformly than susceptors with uniform longitudinal and transverse impedance when subjected to the varying magnetic field created with a cup coil induction coil.

2. The susceptor of claim 1 wherein the aspect ratio is approximately two.

3. The susceptor of claim 1 wherein the aspect ratio is between about 2.4 and 2.8.

4. The susceptor of claim 1 wherein the electrically conductive material is selected from the group consisting of copper, nickel, or, nickel-coated copper.

5. The susceptor of claim 4 wherein the aspect ratio is between about 2.4 and 2.8 and further comprising edge regions attached to and transversely separated by the susceptor, each edge region being twice as thick as the susceptor and being formed by folding the susceptor over onto itself the double thickness edge regions having a lower impedance than the susceptor, thereby reducing the likelihood of overheating at the edges of the weld when using the susceptor to weld with a cup coil induction coil.

6. The susceptor of claim 1 further comprising edge regions of the material attached to and transversely separated by the susceptor, the edge regions having edge openings through the material, wherein the aspect ratio of the edge openings is higher than the aspect ratio of openings in the susceptor so that the longitudinal impedance is lower in the edge regions relative to the susceptor, thereby reducing the likelihood of overheating of the edges of the weld when using the susceptor to weld with a cup coil induction coil.

7. The susceptor of claim 1 embedded within an resin.

8. The susceptor of claim 7 wherein the resin is a thermoplastic selected from the group consisting of polyimide, PEEK, PES, and PEKK and wherein the adhesive/susceptor is about 0.25 mm thick.

9. A method for thermoplastic welding to join two resin composite parts using induction to heat a susceptor along a bond line, comprising the steps of:

(a) positioning a tailored susceptor and a thermoplastic resin between the two resin matrix composite parts to define the bond line, the susceptor having edge treatment to adjust the longitudinal impedance of the susceptor in edge regions over the longitudinal impedance in a central portion of the susceptor to promote current flow near the edges relative to the central portion so that the susceptor heats relatively uniformly when subjected to the varying magnetic field of a cup coil induction coil;

(b) heating the susceptor with the induction coil to create a substantially uniform temperature in the bond line and to melt the resin;

(c) resolidifying the resin to form a thermoplastic weld between the two composite parts.

10. The method of claim 9 wherein the susceptor is embedded in the resin.

11. The method of claim 9 wherein the portion of each composite part adjacent the bond line is resin rich.

12. The method of claim 11 wherein the susceptor has a longitudinal impedance that is low relative to the transverse impedance.

13. The method of claim 12 wherein the edge treatment comprises thickened portions of the susceptor near the edges to reduce the impedance in these thickened edge portions.

14. The method of claim 12 wherein the susceptor has an array of openings wherein the openings in the central portion are a regular pattern of substantially uniform size and shape wherein each opening has an aspect ratio (i.e., length/width) lower than the aspect ratio of openings in the edge regions, the openings in the edge regions also being in a regular pattern of substantially uniform size and shape.

15. An integral composite sandwich structure comprising;

a first non-metallic member;

a second non-metallic member;

a thermoplastic resin layer inserted between said non-metallic members for joining the first and second non-metallic members to define a bond line;

an eddy current conducting sheet of material disposed between said nonmetallic members adjacent the resin layer;

the conducting sheet being tailored at the edges to achieve more uniform heating in the bond line and having a plurality of openings the openings having a length dimension and a width dimension, the ratio of the length dimension to the width dimension being at least two and wherein the openings in the eddy current conducting sheet are diamond shaped.

16. The composite sandwich of claim 15 wherein the ratio being in the range of from about 2.4–2.8.

17. A susceptor for use in thermoplastic welding of composite parts, comprising a sheet of material susceptible to heating by induction, the sheet having edge portions having greater thickness than the center portion to provide a higher surface area for distributing current and a lower impedance in the edges, both the center portion and the edge portions including a plurality of openings.

18. The susceptor of claim 17 wherein the sheet is embedded within a thermoplastic resin.

19. The susceptor of claim 17 wherein the openings are in a regular spaced array.

20. The susceptor of claim 19 wherein openings in the edge portions have a higher aspect ratio (i.e., length/width) than corresponding openings in the center portion so that the longitudinal conductivity of the sheet in the edge portions is higher than the transverse conductivity in the edges.

21. A method for thermoplastic welding using induction heating, comprising the steps of:
(a) positioning a tailored susceptor and a thermoplastic adhesive between two resin matrix composite parts to define a bond line, the susceptor having edge treatment to adjust the impedance to promote current flow near the edges relative to the center so that the susceptor heats relatively uniformly;
(b) heating the susceptor with an induction coil to melt the adhesive;
(c) resolidifying the adhesive to form a thermoplastic weld between the two composite parts.

22. The method of claim 21 wherein the susceptor is embedded in the adhesive.

* * * * *